(12) United States Patent
Moore et al.

(10) Patent No.: US 11,788,435 B2
(45) Date of Patent: Oct. 17, 2023

(54) PIN MEMBER FOR TURBINE

(71) Applicant: Cummins Ltd, London (GB)

(72) Inventors: Simon David Moore, Huddersfield (GB); Karl Conlon, Huddersfield (GB); Matthew William Edwards, Huddersfield (GB)

(73) Assignee: CUMMINS LTD., Columbus, IN (US)

( * ) Notice: Subject to any disclaimer, the term of this patent is extended or adjusted under 35 U.S.C. 154(b) by 0 days.

(21) Appl. No.: 17/776,134

(22) PCT Filed: Nov. 11, 2020

(86) PCT No.: PCT/EP2020/081810
§ 371 (c)(1),
(2) Date: May 11, 2022

(87) PCT Pub. No.: WO2021/094406
PCT Pub. Date: May 20, 2021

(65) Prior Publication Data
US 2022/0403757 A1 Dec. 22, 2022

(30) Foreign Application Priority Data
Nov. 14, 2019 (GB) ..................................... 1916604

(51) Int. Cl.
*F01D 25/24* (2006.01)
*F01D 9/04* (2006.01)
*F01D 25/28* (2006.01)

(52) U.S. Cl.
CPC ............. *F01D 25/24* (2013.01); *F01D 9/041* (2013.01); *F01D 25/28* (2013.01);
(Continued)

(58) Field of Classification Search
CPC .......... F01D 25/24; F01D 25/28; F01D 9/041; F01D 17/141; F01D 17/143;
(Continued)

(56) References Cited

U.S. PATENT DOCUMENTS 8,162,597 B2 * 4/2012 LeJars ................... F01D 5/3023
415/209.3
8,721,256 B2 * 5/2014 Servant ................. F01D 25/162
411/398

(Continued)

FOREIGN PATENT DOCUMENTS

CN 201908934 U 7/2011
CN 102852944 A 1/2013
(Continued)

OTHER PUBLICATIONS

International Preliminary Report on Patentability for International patent application No. PCT/EP2020/081810, filed Nov. 11, 2020, dated May 17, 2022.
(Continued)

*Primary Examiner* — Igor Kershteyn
(74) *Attorney, Agent, or Firm* — Faegre Drinker Biddle & Reath LLP

(57) ABSTRACT

A pin member is proposed for a turbo-machine having a shroud arranged to rotate within a turbine housing. The pin member is configured to limit this rotation. It is a one-piece element comprising a cylindrical body and a limit surface for opposing motion of the shroud.

14 Claims, 11 Drawing Sheets

(52) U.S. Cl.
CPC ...... *F05D 2220/40* (2013.01); *F05D 2230/64* (2013.01); *F05D 2240/11* (2013.01); *F05D 2250/12* (2013.01); *F05D 2250/231* (2013.01); *F05D 2260/30* (2013.01)

(58) Field of Classification Search
CPC ............... F01D 17/167; F05D 2220/40; F05D 2230/64; F05D 2240/11; F05D 2250/12; F05D 2250/231; F05D 2260/30
See application file for complete search history.

(56) References Cited

U.S. PATENT DOCUMENTS

| | | | |
|---|---|---|---|
| 10,526,921 B2* | 1/2020 | Taxacher | .................. F01D 5/22 |
| 2009/0087304 A1 | 4/2009 | Lejars | |
| 2011/0189012 A1 | 8/2011 | Servant | |
| 2013/0078086 A1* | 3/2013 | Breugnot | .............. F01D 25/246 |
| | | | 415/182.1 |
| 2017/0058762 A1* | 3/2017 | Marques | ................. F01D 25/24 |
| 2018/0363504 A1 | 12/2018 | Taxacher | |
| 2019/0203649 A1* | 7/2019 | Thomas | .................... F02C 7/20 |

FOREIGN PATENT DOCUMENTS

| | | |
|---|---|---|
| CN | 202768593 U | 3/2013 |
| CN | 104295590 A | 1/2015 |
| CN | 204458752 U | 7/2015 |
| EP | 1306525 A1 | 5/2003 |
| EP | 3330492 A1 | 6/2018 |
| FR | 2960591 A1 | 12/2011 |
| WO | 2019220112 A1 | 11/2019 |

OTHER PUBLICATIONS

International Search Report and Written Opinion for International patent application No. PCT/EP2020/081810, filed Nov. 11, 2020, dated Jan. 14, 2021.
Examiner's Report for UK patent application No. GB1916604.0, dated Feb. 24, 2023.

* cited by examiner

PIN MEMBER FOR TURBINE

CROSS-REFERENCE TO RELATED APPLICATIONS

The present application is a 35 U.S.C. § 371 national stage entry of International Application No. PCT/EP2020/081810, titled "PIN MEMBER FOR TURBINE," filed on Nov. 11, 2020, which claims priority to United Kingdom Patent No. GB 1916604.0, titled "PIN MEMBER FOR TURBINE," filed on Nov. 14, 2019, the complete disclosures of which are expressly incorporated herein by reference.

FIELD OF THE INVENTION

The present invention relates to vane arrangement for positioning at a gas inlet of a turbo-machine such as a turbo-charger.

BACKGROUND OF THE INVENTION

Turbochargers are well-known devices for supplying air to the intake of an internal combustion engine at pressures above atmospheric pressure (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the inlet manifold of the engine, thereby increasing engine power. The turbocharger shaft is conventionally supported by journal and thrust bearings, including appropriate lubricating systems, located within a central bearing housing connected between the turbine and compressor wheel housing.

In known turbochargers, the turbine stage comprises a turbine chamber within which the turbine wheel is mounted; an annular inlet passage defined between facing radial walls arranged around the turbine chamber; an inlet arranged around the inlet passage; and an outlet passage extending axially from the turbine chamber. The passages and chambers communicate such that pressurised exhaust gas admitted to the inlet chamber flows through the inlet passage to the outlet passage via the turbine and rotates the turbine wheel.

It is known to improve turbine performance by providing vanes, referred to as nozzle vanes, in the inlet passage so as to deflect gas flowing through the inlet passage towards the direction of rotation of the turbine wheel. Each vane is generally laminar, and is positioned with one radially outer surface arranged to oppose the motion of the exhaust gas within the inlet passage, i.e. the radially inward component of the motion of the exhaust gas in the inlet passage is such as to direct the exhaust gas against the outer surface of the vane, and it is then redirected into a circumferential motion.

Turbines may be of a fixed or variable geometry type. Variable geometry type turbines differ from fixed geometry turbines in that the geometry of the inlet passage can be varied to optimise gas flow velocities over a range of mass flow rates so that the power output of the turbine can be varied to suit varying engine demands.

In one form of a variable geometry turbocharger, a nozzle ring carries a plurality of axially extending vanes, which extend into the air inlet, and through respective apertures ("slots") in a shroud which forms a radially-extending wall of the air inlet. The nozzle ring is axially movable by an actuator to control the width of the air passage. Movement of the nozzle ring also controls the degree to which the vanes project through the respective slots. The shroud is ring-shaped and encircles the rotational axis.

An example of such a variable geometry turbocharger is shown in FIGS. 1(a) and 1(b), taken from U.S. Pat. No. 8,172,516. The illustrated variable geometry turbine comprises a turbine housing 1 defining an inlet chamber 2 to which gas from an internal combustion engine (not shown) is delivered. The exhaust gas flows from the inlet chamber 2 to an outlet passage 3 via an annular inlet passage 4. The inlet passage 4 is defined on one side by the face of a movable annular wall member 5 which constitutes the nozzle ring, and on the opposite side by an annular shroud 6, which covers the opening of an annular recess 8 in the facing wall. The shroud 6 is a ring-shaped member (a one-piece unit) defining a central aperture and encircling the rotational axis. The facing wall is defined by a portion 28 of the turbine housing 1. The shroud 6 is connected to the portion 28 of the turbine housing 1 by a bracket 29 at the radially-outer side of the shroud 6. In some arrangements a retention ring (not shown) is provided partially inserted into a radially-outwardly facing recess in the bracket 29, and a radially outer portion of the retention ring is retained by the portion 28 of the turbine housing 1.

Gas flowing from the inlet chamber 2 to the outlet passage 3 passes over a turbine wheel 9 and as a result torque is applied to a turbocharger shaft 10 supported by a bearing assembly 14 that drives a compressor wheel 11. Rotation of the compressor wheel 11 about rotational axis 100 pressurizes ambient air present in an air inlet 12 and delivers the pressurized air to an air outlet 13 from which it is fed to an internal combustion engine (not shown). The speed of the turbine wheel 9 is dependent upon the velocity of the gas passing through the annular inlet passage 4. For a fixed rate of mass of gas flowing into the inlet passage, the gas velocity is a function of the width of the inlet passage 4, the width being adjustable by controlling the axial position of the nozzle ring 5. As the width of the inlet passage 4 is reduced, the velocity of the gas passing through it increases. FIG. 1(a) shows the annular inlet passage 4 closed down to a minimum width, whereas in FIG. 1(b) the inlet passage 4 is shown fully open.

The nozzle ring 5 supports an array of circumferentially and equally spaced vanes 7, each of which extends across the inlet passage 4. The vanes 7 are orientated to deflect gas flowing through the inlet passage 4 towards the direction of rotation of the turbine wheel 9. When the nozzle ring 5 is proximate to the annular shroud 6 and to the facing wall, the vanes 7 project through suitably configured slots in the shroud 6 and into the recess 8. Each vane has an "inner" major surface which is closer to the rotational axis 100, and an "outer" major surface which is further away. Both the nozzle ring 5 and the shroud 6 are at a fixed angular position about the axis 100. The vanes 7 are illustrated in FIGS. 1(a) and 1(b) as having a chamfered end portion (towards the right of the figures), but in most modern arrangements the vanes are either longitudinally symmetric along their whole length, or else composed of two sections which are each longitudinally symmetric but which have a different profile from each other as viewed in the axial direction.

A pneumatically or hydraulically operated actuator 16 is operable to control the axial position of the nozzle ring 5 within an annular cavity 19 defined by a portion 26 of the turbine housing via an actuator output shaft (not shown), which is linked to a stirrup member (not shown). The stirrup member in turn engages axially extending guide rods (not shown) that support the nozzle ring 5. Accordingly, by appropriate control of the actuator 16 the axial position of the guide rods and thus of the nozzle ring 5 can be controlled. It will be appreciated that electrically operated actuators could be used in place of a pneumatically or hydraulically operated actuator 16.

The nozzle ring 5 has axially extending inner and outer annular flanges 17 and 18 respectively that extend into the annular cavity 19, which is separated by a wall 27 from a chamber 15. Inner and outer sealing rings 20 and 21, respectively, are provided to seal the nozzle ring 5 with respect to inner and outer annular surfaces of the annular cavity 19, while allowing the nozzle ring 5 to slide within the annular cavity 19. The inner sealing ring 20 is supported within an annular groove 22 formed in the inner surface of the cavity 19 and bears against the inner annular flange 17 of the nozzle ring 5, whereas the outer sealing ring 21 is supported within an annular groove 23 provided within the annular flange 18 of the nozzle ring 5 and bears against the radially outermost internal surface of the cavity 19. It will be appreciated that the inner sealing ring 20 could be mounted in an annular groove in the flange 17 rather than as shown, and/or that the outer sealing ring 21 could be mounted within an annular groove provided within the outer surface of the cavity rather than as shown. A first set of pressure balance apertures 25 is provided in the nozzle ring 5 within the vane passage defined between adjacent apertures, while a second set of pressure balance apertures 24 are provided in the nozzle ring 5 outside the radius of the nozzle vane passage.

Note that in other known turbomachines, the nozzle ring is axially fixed and an actuator is instead provided for translating the shroud in a direction parallel to the rotational axis. This is known as a "moving shroud" arrangement.

In known variable geometry turbo-machines which employ vanes projecting through slots in a shroud, a clearance is provided between the vanes and the edges of the slots to permit thermal expansion of the vanes as the turbocharger becomes hotter. As viewed in the axial direction, the vanes and the slots have the same shape, but the vanes are smaller than the slots. In a typical arrangement, the vanes are positioned with an axial centre line of each vane in a centre of the corresponding slot, such that in all directions away from the centre line transverse to the axis of the turbine, the distance from the centre line to the surface of the vane is the same proportion of the distance from the centre line to the edge of the corresponding slot. The clearance between the vanes and the slots is generally arranged to be at least about 0.5% of the distance of a centre of the vanes from the rotational axis (the "nozzle radius") at room temperature (which is here defined as 20 degrees Celsius) around the entire periphery of the vane (for example, for a nozzle radius of 46.5 mm the clearance may be 0.23 mm, or 0.5% of the nozzle radius). This means that, if each of the vanes gradually thermally expands perpendicular to the axial direction, all points around the periphery of the vane would touch a corresponding point on the slot at the same moment. At all lower temperatures, there is a clearance between the entire periphery of the vane and the edge of the corresponding slot.

SUMMARY OF THE INVENTION

The present invention aims to provide new and useful vane assemblies for use in a turbo-machine, as well as new and useful turbo-machines (especially turbo-chargers) incorporating the vane assemblies.

In an earlier patent application GB 1619347.6, the present applicant proposed that in the turbine of a turbomachine of the kind in which, at a gas inlet between a nozzle ring and a shroud, vanes project from the nozzle through slots in the shroud, one "conformal" portion of a lateral surface of each vane (i.e. a surface including a direction parallel to the rotational axis) substantially conforms to the shape of a corresponding "conformal" portion of a lateral surface of the corresponding slot at room temperature, so as to enable the respective conformal portions of the surfaces to be placed relative to each other with only a small clearance between them. An advantage of this is that gas flow between the respective conformal portions of the surfaces of the vane and the slot can be substantially reduced. This reduces leakage of gas into or out of a recess on the other side of the shroud from the nozzle ring. Such leakage reduces the circumferential redirection of the gas caused by the vanes, and has been found to cause significant losses in efficiency.

In such an arrangement, the conformal portions of the vane surface and slot surface can be positioned close to each other, or even in contact, at low temperature (such as room temperature). At higher temperatures, if the shroud and nozzle ring expand uniformly, this contact is maintained. However, uneven thermal expansion of the components of the turbine in use may cause the vanes and the slots to press against one another, making it harder to move the vanes axially relative to the slots. To some extent this effect may be reduced by any free play in the mounting of the shroud and nozzle ring, which permits the vane to retract away from the inwardly-facing surface of the slot, to prevent the respective surfaces being pressed together with high force. Any such free play is not due to design but rather the result of tolerances in the formation of components. It varies from one turbomachine to another, and it has been found experimentally that such free play permits relative rotation of the nozzle ring with respect to the shroud by significantly less than 0.1 degrees, e.g. up to 0.05 degrees.

In earlier patent application GB1807881.6 (which was unpublished at the priority date of the present application), the present invention proposed that a turbine (for example of a turbo-charger) should permit a nozzle ring to move relative to the shroud in the circumferential direction by a larger angular amount (at least 0.1 degrees), to relieve pressure between the vanes and the edges of the respective slots. The concept of arranging for the nozzle ring to be rotatable relative to the shroud is referred to here as "clocking". In one possibility, the nozzle ring was substantially rotationally fixed relative to the turbine housing, and the shroud was rotatable relative to the turbine housing about the turbine axis.

We refer to a connection between the turbine housing and the shroud which permits relative rotation respectively of the shroud with respect to the turbine housing by at least 0.1 degree, as a coupling mechanism. In one possibility, the coupling mechanism may substantially fix the axial position of the shroud, and/or maintain a centre of the shroud substantially on the axis of the turbine wheel, but may permit the shroud to rotate about the axis of the turbine wheel relative to the turbine housing. The coupling mechanism may permit rotation of the shroud relative to the turbine housing through a fixed range of angles which is at least 0.1 degree, or freely (i.e. by an unlimited angular amount). In the latter case the rotation of the shroud/nozzle ring relative to the turbine housing may be limited only by interaction between the vanes of the nozzle ring and the slots of the shroud. The turbine may include an actuator for rotating the shroud about the axis relative to the turbine housing. The actuator may be typically mounted on the turbine housing. In one possibility, the coupling mechanism couples the shroud to the turbine housing via the actuator.

In general terms, the present invention proposes a pin member suitable for limiting rotational movement of the shroud relative to the turbine housing. In use, at least one of the pin members is inserted into an aperture in the turbine housing, which fixes the pin member to the turbine housing at a specific angular position about the rotational axis of the turbine. The pin member is a one-piece element comprising a cylindrical body and a head portion having a limit surface for opposing motion of the shroud.

The pin member comprises a generally cylindrical body defining a pin axis, and a head portion at one end of the cylindrical body and integrally formed with the cylindrical body so that the head portion and the cylindrical body together form a one-piece unit. The head portion has two opposed surfaces: a limit surface for in use bearing against a surface of the shroud and limiting its rotational motion, and a positioning surface for positioning the pin member.

The head portion of the pin member has a head surface which is transverse to the pin axis, and bounded on one side by the limit surface and on the other side by the positioning surface. In use a first direction on the head surface which is transverse to the limit surface and the positioning surface, and which extends from the limit surface towards the positioning surface, is aligned with the circumferential direction of the turbine housing; and a second direction on the head surface, transverse to the first direction and to the pin axis, is aligned with the radial direction.

The extent $H_1$ of the limit surface in the second direction is less than the extent $H_2$ of the positioning surface. To facilitate this, a recess may be formed to one end of the head surface, extending in the first direction. This gives the head surface generally an L-shape. That is, the head surface may be substantially composed of two generally rectangular portions, with a first of the rectangular portions being further in the second direction than second of the rectangular portions. The first of the rectangular portions may have a greater area than the second of the rectangular portions. The first and second rectangular portions are both bordered by the positioning surface. An opposed edge of the first rectangular portion constitutes the limit surface, and an opposed edge of the second rectangular portion faces the recess.

The extent of the positioning surface may be designed to be as long as possible in the second direction, which makes it easier to position the pin member in a turbine housing (as described below), for example by positioning the positioning surface along a surface of a positioning tool used during assembly.

Conversely, if the limit surface is too long in the second direction, this has the disadvantage that its ends are more likely to impact the shroud in use.

Additionally, providing the recess reduces the amount of material required to produce the pin member.

The head portion of the pin member has a greater extent $W_1$ in the first direction, than the extent $W_2$ in the first direction of the second rectangular portion. Optionally, the extent $W_1$ of the first rectangular portion in the first direction is less than 7 mm, less than 6 mm, less than 5 mm, less than 4 mm or even less than 3 mm.

The limit surface may be substantially flat. Alternatively it may be convex, so that if the surface of the shroud which engages the limit surface is flat (or convex, or concave but with a larger radius of curvature than the limit surface of the pin member), the contact between the shroud and the limit surface of the pin member is substantially at a point (e.g. if the limit surface is a portion of a sphere or spheroid) or along a line.

In fact, it is preferred that the limit surface has translational symmetry in a direction parallel to the pin axis (that is, the limit surface is portion of a cylinder, though not necessarily a cylinder with a circular cross-section). The surface of the shroud against which the head portion of the pin bears may be substantially flat, so that the contact between them is a line contact.

The radius of curvature of the limit surface, R, is selected to be greater (e.g. at least twice as great or even at least 3 times, 4 times or even at least 5 times as great) as the extent $W_1$ in the first direction of the head portion of the pin member. For example, it may have a radius R=22 mm, whereas $W_1$ may be about 4 mm. Note that a smaller R may lead to the force being overly concentrated in the portion of the limit surface which contacts the shroud, leading to undesirable wear.

Preferably $W_1$, $W_2$, $H_1$, $H_2$ and R satisfy the equation:

$$\frac{(W_1 - W_2)^2 + \left(H_2 - \frac{1}{2}H_1\right)^2}{2(W_1 - W_2)} \le R \le 20H_1.$$

The pin member may be formed without an internal interface (e.g. due to an abrupt change in material composition), for example by a molding process, such as a metal-injection-molding (MIM) process. Optionally, the limit surface of the pin member may be subject to a machining operation following the molding to increase the precision of its shape.

The material of the pin member may be an alloy comprising Cobalt.

In a further aspect, the present invention provides, in combination, a turbine housing for a turbine and defining a central axis which in use is the rotational axis of the turbine, and at least one pin member as described above. A surface of the turbine housing facing parallel to the axis may be formed, for each pin, with a respective aperture which receives the cylindrical body of the pin member. Motion of the pin member into the aperture may be limited by interaction of the surface of the turbine housing and the head portion of the pin member. Preferably, the pin member is held in the aperture by an interference fit between an outer surface of the cylindrical body and an inwardly-facing surface of the aperture. This is sufficient to prevent rotation of the pin about the pin axis within the aperture.

The aperture is preferably not a through-hole, and may be formed with a chamber to contain gas is trapped in the aperture when the cylindrical body of the pin member is inserted, so that the pressure of the gas does not become sufficiently higher, even at an operating temperature of the turbine housing, to overcome the force of the interference fit and expel the cylindrical body of the pin member from the aperture.

Preferably, the cylindrical body of the pin member has circular cross-section, to facilitate its manufacture. Similarly, the corresponding inwardly-facing surface of the corresponding aperture has a circular cross-section in a depth direction of the aperture, and a cross-sectional area only very slightly less than that of the cylindrical body of the pin member. In this case, the aperture may be formed conveniently by drilling. To form the chamber, a portion of the aperture furthermost in the depth direction of the aperture may have a smaller cross-sectional area, specifically smaller than that of the cylindrical body of the pin member.

In a further aspect, the invention provides a turbine assembly which is a combination of a turbine housing defining a central axis which in use is the rotational axis of the turbine, and at least one pin member as described above. Each pin member may be inserted into a corresponding aperture of the turbine housing.

In a further aspect, the invention provides a turbine including a turbine housing in combination with one or more of the pin members defined above, and a turbine wheel mounted within the turbine housing.

In a further aspect, the invention provides a turbo-charger comprising such a turbine.

In this document, to say that two faces are opposed means that they face in substantially opposite directions. That is, respective normal directions out of the surfaces are substantially opposite. To say that a surface or body is "cylindrical" means that it has translational symmetry along an axis, but does not necessarily imply that the cross section of the surface or body transverse to that axis is circular.

BRIEF DESCRIPTION OF THE FIGURES

Embodiments of the invention will now be described for the sake of example only, with reference to the following drawings in which.

DETAILED DESCRIPTION OF THE EMBODIMENTS

Figure 1A:
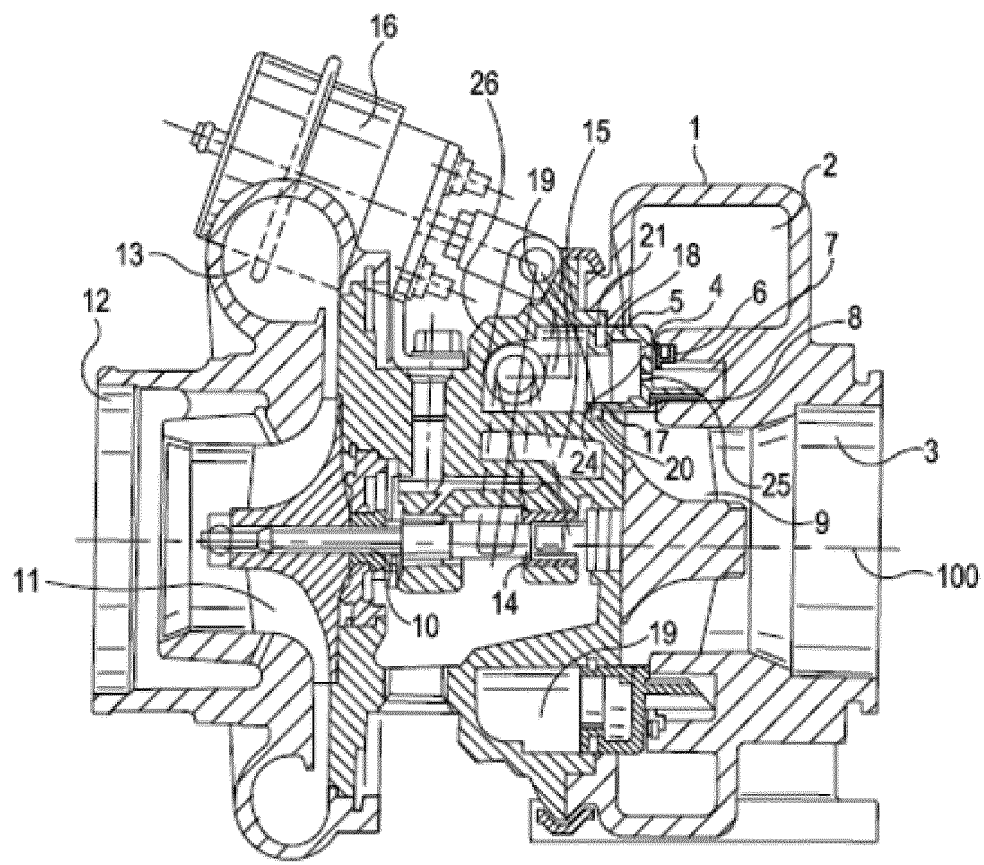
FIG. 1 is composed of FIG. 1(a) which is an axial cross-section of a known variable geometry turbine, and FIG. 1(b) which is a cross-section of a part of the turbine of FIG. 1(a)
Figure 1B:
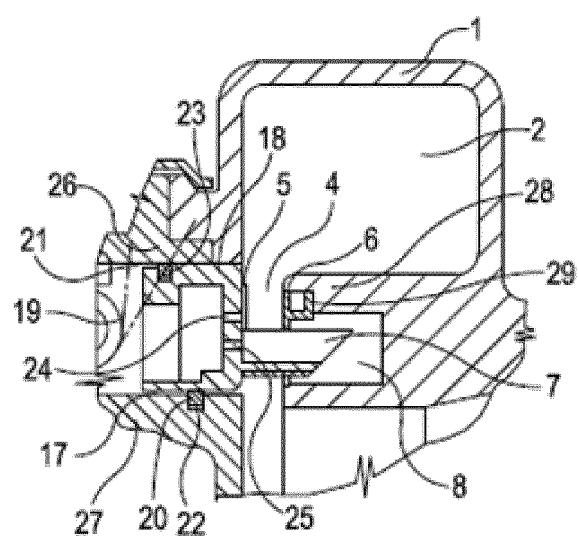
Figure 2:
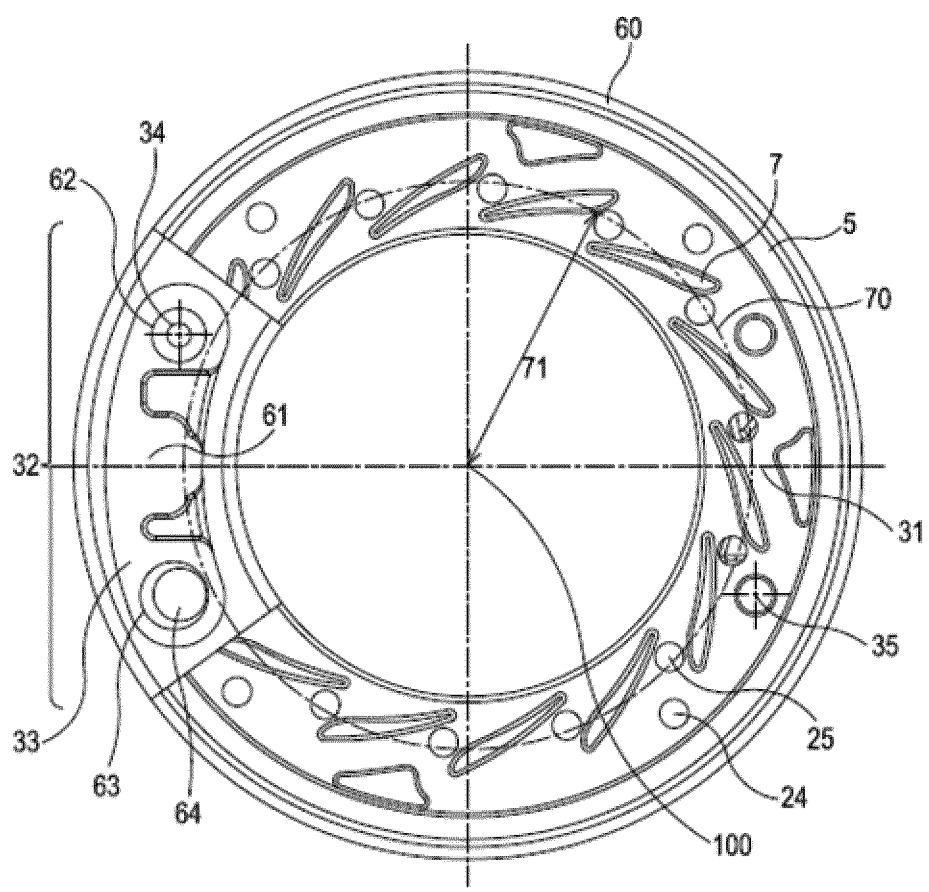
FIG. 2 is an axial view of a nozzle ring which can be used in the known arrangement of FIG. 1.

Referring to FIG. 2, a nozzle ring is shown which could be used in the known turbocharger of FIG. 1. The nozzle ring is viewed in an axial direction from the right as viewed in FIG. 1(a) (this direction is also referred to here as "from the turbine end" of the turbocharger), from a position between the nozzle ring 5 and the shroud 6.

The axis of the shaft about which the turbine wheel 9 (not shown in FIG. 2, but visible in FIG. 1(a)) and compressor wheel 11 (also not shown in FIG. 2, but visible in FIG. 1(a)) rotate is denoted as 100.

Viewed in this axial direction, the substantially-planar annular nozzle ring 5 encircles the axis 100. From the nozzle ring 5, vanes 7 project in the axial direction. Defining a circle 70 centred on the axis 100 and passing through the centroids of the profiles of the vanes 7, we can define the nozzle radius 71 as the radius of the circle 70.

Gas moves radially inwardly between the nozzle ring 5 and the shroud 6. In some turbines, the radially outer surface of the vanes 7 is a "high pressure" surface, while the radially inward surface of the vanes 7 is a "low pressure" surface. In other turbines, these roles are reversed.

The nozzle ring 5 is moved axially by an actuator 16 (not shown in FIG. 2, but visible in FIG. 1(a)) within an annular cavity (also not shown in FIG. 2, but visible in FIG. 1(a)) defined by a portion 60 of the turbine housing. Each vane 7 is optionally longitudinally-symmetric (that is, its profile as viewed in the axial direction, may be same in all axial positions), although in some embodiments only a portion of the vane 7 is longitudinally-symmetric.

The actuator exerts a force on the nozzle ring 5 via two axially-extending guide rods. In FIG. 2, a portion 32 of the nozzle ring 5 is omitted, making it possible to view the connection between the nozzle ring 5 and a first of the guide rods. The guide rod is not shown, but its centre is in a position labelled 61. The guide rod is integrally formed with a bracket 33 (commonly called a "foot") which extends circumferentially from the guide rod to either side. The bracket 33 contains two circular apertures 62, 63. The surface of the nozzle ring 5 which faces away from the shroud 6 is formed with two bosses 34, 64 which project from the nozzle ring 6. Each of the bosses 34, 64 has a circular profile (viewed in the axial direction). The bosses 34, 64 are inserted respectively in the apertures 62, 63, and the bosses 34, 64 are sized such that the boss 34 substantially fills the aperture 62, while the boss 64 is narrower than the aperture 63. The connection between the boss 34 and the aperture 62 fixes the circumferential position of the nozzle ring 5 with respect to the bracket 33 (in typical realizations, the relative circumferential motion of the nozzle ring 5 and the shroud 6 about the axis 100 is no more than 0.05 degrees). However, the clearance between the boss 64 and the aperture 63 permits the bracket 33 to rotate slightly about the boss 34 if the guide rods move apart radially due to thermal expansion. For that reason, the boss 34 is referred to as a "pivot".

The location, as viewed in the axial direction, at which a second of the guide rods is connected to the nozzle ring 5 is shown as 31. The connection between the nozzle ring 5 and the second guide rod is due to a second bracket (not visible in FIG. 2) integrally attached to the second guide rod. The second bracket is attached to the rear surface of the nozzle ring 5 in the same way as the bracket 33. The pivot for the second bracket is at the location 35.

Figure 3:
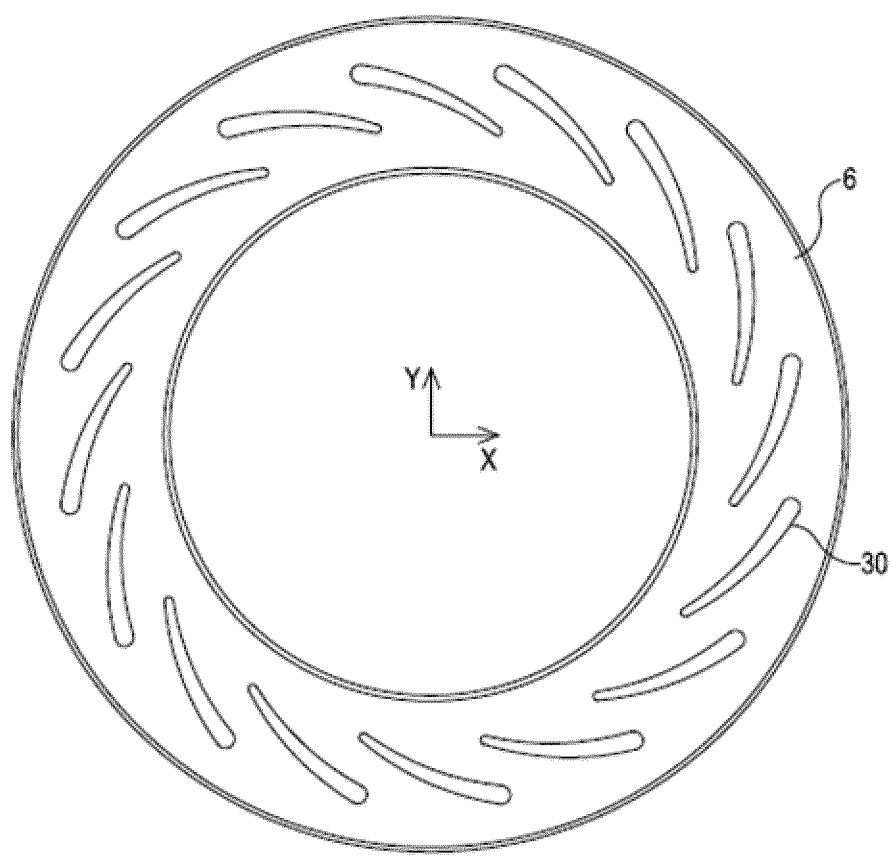
FIG. 3 is an axial view of a shroud which can be used in the known arrangement of FIG. 1.

Holes 24, 25 are balance holes provided in the nozzle rings for pressure equalisation. They are provided to achieve a desirable axial load (or force) on the nozzle rings. Facing the nozzle ring 5, is the shroud 6 illustrated in FIG. 3. FIG. 3 is a view looking towards the shroud 6 from the nozzle ring 5 (i.e. towards the right side of FIG. 1). The shroud defines slots 30 (that is, through-holes) for receiving respective ones of the vanes 7. The edge of each slot is an inwardly-facing lateral (i.e. transverse to the axis 100) slot surface. Note that in FIG. 7 the slots 30 are not illustrated as having the same profile as the vanes 7 of FIG. 2, but typically the respective profiles do have substantially the same shape although the slots are of greater size than the vanes.

Figure 4:
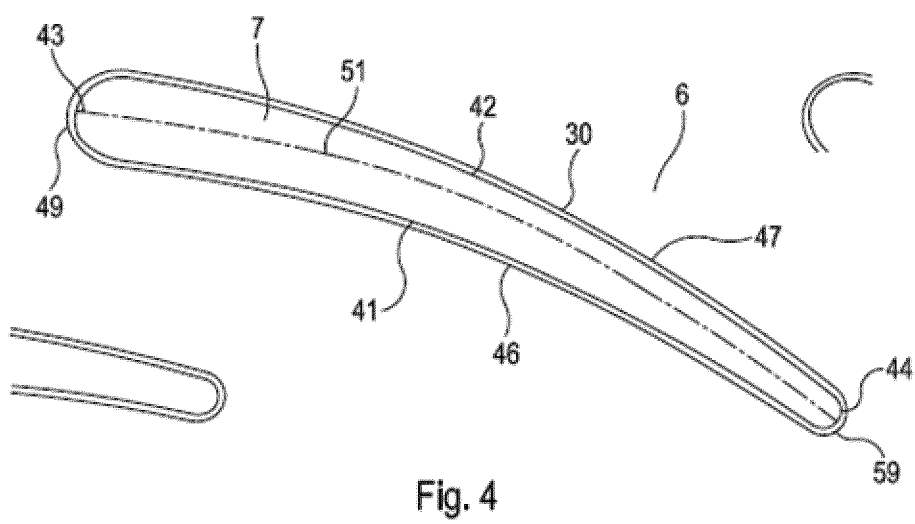
FIG. 4 shows the positional relationship between the nozzle ring of FIG. 2 and the shroud of FIG. 3.

FIG. 4 is another view looking in the axial direction from the nozzle ring 5 towards the shroud 6 (i.e. towards the right side of FIG. 1(*a*)), showing a representative vane 7 inserted into a respective representative slot 30. The vane 7 has a generally arcuate (crescent-shaped) profile, although in other forms the vanes are substantially planar. Specifically, the vane 7 has a vane inner surface 41 which is closer to the wheel. The vane inner surface 41 is typically generally concave as viewed in the axial direction, but may alternatively be planar. The vane 7 also has a vane outer surface 42 which is closer to the exhaust gas inlet of the turbine. Each of the vane inner and outer surfaces 41, 42 is a major surface of the vane. The vane outer surface 42 is typically convex as viewed in the axial direction, but may also be planar. The major surfaces 41, 42 of the vane 7 face in generally opposite directions, and are connected by two axially-extending end surfaces 43, 44 which, as viewed in the axial direction, each have smaller radii of curvature than either of the surfaces 41, 42. The end surfaces 43, 44 are referred to respectively as the leading edge surface 43 and the trailing edge surface 44.

In most arrangements, the vane outer surface 42 is arranged to oppose the motion of the exhaust gas the inlet passage, i.e. the motion of the exhaust gas in the inlet passage is such as to direct the exhaust gas against the vane outer surface. Thus, the vane outer surface 42 is typically at a higher pressure than the vane inner surface 41, and is referred to as the "high pressure" (or simply "pressure") surface, while the vane inner surface 41 is referred to as the "low pressure" (or "suction") surface. These oppose corresponding portions of the inwardly-facing surface which define the edge of the slot 30, and which are given the same respective name.

In some possible arrangements, it is the vane inner surface 41 which redirects the flow of the gas. In this case, the vane inner surface 41 is typically at a higher pressure than the vane outer surface 42, and is referred to as the "high pressure" (or simply "pressure") surface, while the vane outer surface 42 is referred to as the "low pressure" (or "suction") surface. Again, they oppose corresponding portions of the inwardly-facing surface which define the edge of the slot 30, and which are given the same respective name.

As viewed in the axial direction, each vane 7 has a median line 51 which extends from one end of the vane to the other (half way between the vane inner and outer surfaces 41, 42 when viewed in the axial direction), and this median line has both a radial and a circumferential component. We refer to the surface of the slot which the vane inner surface 41 faces as the slot inner surface 46, and the surface of the slot which the vane outer surface 42 faces as the slot outer surface 47. As shown in FIG. 4, there is a gap of substantially constant width between the periphery of the vane 7 and the surface of the slot 30. This gap includes four portions: between the vane inner surface 41 and the slot inner surface 46; between the vane outer surface 42 and the slot outer surface 47; and between the vane's leading and trailing edge surfaces 43, 44, and respective leading and trailing portions 49, 59 of the edge of the slot. The surfaces 46, 47, 49 and 59 together constitute the inwardly-facing slot surface which defines the slot.

Figure 5:
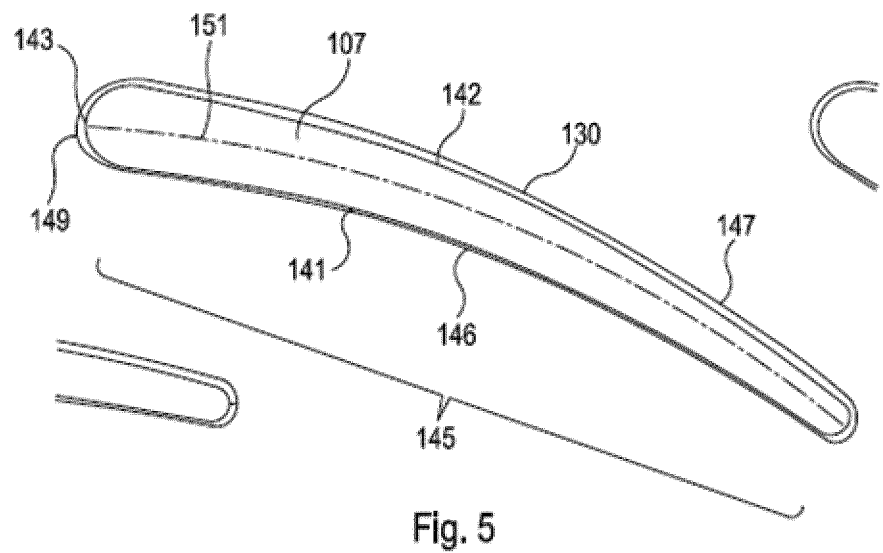
FIG. 5 shows a first possible positional relationship between the vanes and shroud in an embodiment of the invention.

Turning to FIG. 5, a first possible positional arrangement is shown between a vane and shroud slot in a turbine which is an embodiment of the invention. The turbine has the form illustrated in FIGS. 1 and 2, with the difference that the vanes and/or slots in the shroud are differently shaped and sized. In FIG. 5, elements corresponding to elements of FIGS. 1 to 4 are given reference numerals 100 higher. Thus, a representative vane 107 is depicted within a representative slot 130. The vane outer surface 142 faces a slot outer surface 147, and a vane inner surface 141 faces a slot inner surface 146. Optionally, the vane 107 may be longitudinally-symmetric along the whole of its length (i.e. with the same profile, as viewed in the axial direction, in all axial positions). In another possibility, only a part of the vane 107 may be axially symmetric, e.g. including the portion which can be inserted into the slot 130 when the vane 107 is in its most advanced position. In this case, the portion of the vane shown in FIG. 5 is part of this axially symmetric portion of the vane. The vane 107 is integrally formed with the nozzle ring 5, as a one-piece unit, for example by casting and/or machining.

In contrast to the known vanes of FIG. 4, the vane 107 of FIG. 5 has a narrower clearance between the vane inner surface 141 and the opposed slot inner surface 146. By contrast, a much wider gap exists between the vane outer surface 142 and the corresponding portion 147 of the slot outer surface 147. This means that exhaust gas entering the shroud recess 8 between the outer vane surface 142 and the slot outer surface 147 is largely prevented from exiting the shroud recess between the vane inner surface 141 and the slot inner surface 146.

To encourage this effect, the vane surface and slot surface are formed with a conformal portion 145 which extends along at least about 15%, at least about 20%, at least about 30%, at least about 40%, at least about 50%, at least about 60%, or at least about 80% of the length of the median line 151, or even at least 85% or 90% of the length of the median line 151. As illustrated in FIG. 5, the conformal portion 145 of the vane surface in FIG. 5 includes substantially all of the vane inner surface 141. The profile (that is the shape, as viewed in the axial direction) of the vane inner surface 141 and a corresponding portion of the slot inner surface 146 are very similar to each other, so that they can be placed against each other with a very small (e.g. negligible) gap between them along the whole length of the conformal portion 145. Specifically, the profile of the vane inner surface 141 and the corresponding portion of the slot inner surface 146 at room temperature are such that they may be positioned against each other with a gap between them which, e.g. transverse to the median line 151, is no more than 0.35% of the nozzle radius 71, and preferably no more than 0.2% or 0.1% of the nozzle radius 71. On average over the conformal portion 145 of the vane surface, the gap between the vane inner surface 141 and the slot inner surface 146 is no more than 20%, or no more than 10% of the gap between the vane outer surface 142 and the slot outer surface 147. The vane's leading edge surface 143 is spaced from the corresponding portion of the inner surface of the slot 149.

Figure 6:
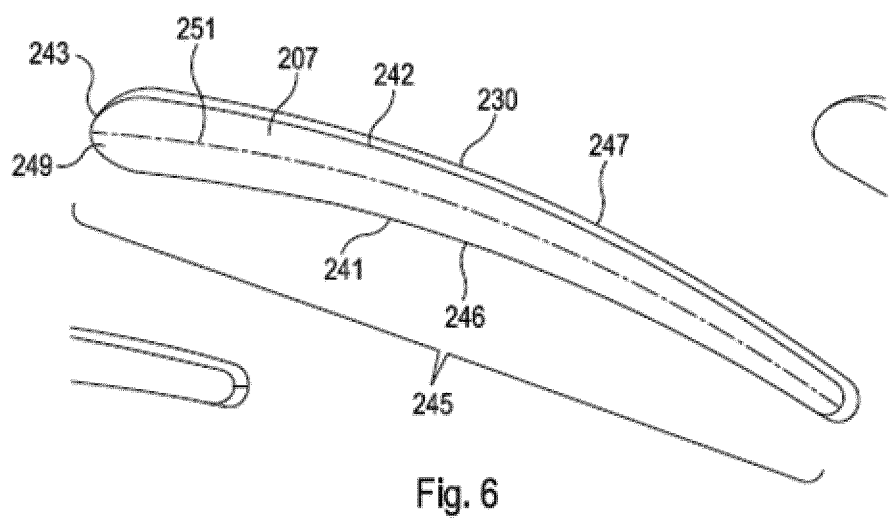
FIG. 6 shows a second possible positional relationship between the vanes and shroud in an embodiment of the invention.

Turning to FIG. 6, a second possible positional arrangement is shown between a vane 207 and shroud 230 slot in a turbine which is an embodiment of the invention. Elements having the same meaning as in FIG. 5 are given reference numerals 100 higher. The vane surface and slot surface are formed with a conformal portion 245 which extends along at least about 90% of the length of the median line 251. The conformal portion 245 of the vane surface in FIG. 6 includes substantially all of the vane inner surface 241 and also the majority of the vane leading end surface 243 which faces a leading edge surface 249 of the slot. At room temperature, the profile of the vane inner surface 241 and a corresponding portion of the slot inner surface 246 are substantially identical to within machining tolerances, so that they can be placed against each other with substantially no gap between them along the whole length of the conformal portion 245. There is a gap between the outer surface 242 of the vane 207 and the facing portion 247 of the slot 230.

Figure 7:
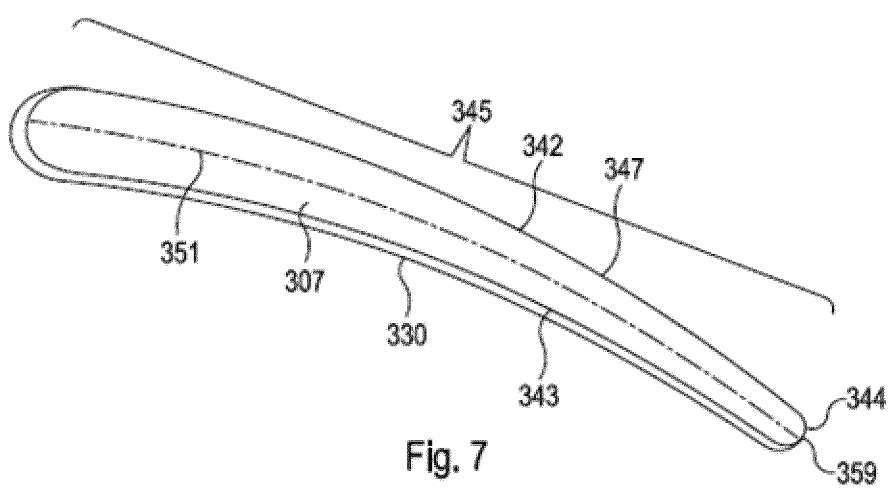
FIG. 7 shows a third possible positional relationship between the vanes and shroud in an embodiment of the invention.

Turning to FIG. 7, a third possible positional arrangement is shown between a vane 307 and shroud slot 330 in a turbine which is an embodiment of the invention. In this arrangement, the conformal portion 345 of the vane 307 is at the vane outer surface 342, and similarly the conformal portion 345 of the slot 330 is at the slot outer surface 347. The conformal portion 345 of the vane 307 includes most of the outer surface 342 of the vane 307, which lies against the slot outer surface 347 along at least 90% of the length of the median line 351. It further includes the trailing surface 344 which lies against the corresponding portion 359 of the slot edge up to a position which is radially inward of the intersection of the median line 351 with the trailing surface 344. This positional arrangement impedes gas flow from the outer surface 342 of the vane 307 to the inner surface 343 by substantially preventing gas leaking between the vane outer surface 342 and the slot outer surface 347.

In the positional relationships of FIGS. 5, 6 and 7, if there is differential thermal expansion between the vanes 107, 207, 307 and the shroud (for example, because they are formed from different materials and/or experience different temperatures), the conformal portion of the vane 107, 207, 307 may be forced against the slot inner surface 146, 246 or slot outer surface 347. Frictional force between them may then prevent axial motion of the vane relative to the shroud. However, even if, as in the system of FIG. 1, the nozzle ring and shroud were mounted in a "fixed" angular position, then there would be a certain free play in the system (for example, due to the coupling of the nozzle ring 5 to the rods illustrated in FIG. 2, the nozzle ring may have a certain inherent freedom to rotate about the axis 100), and experimentally we have found that this may be up to 0.05°. This would allow the vanes 107, 207, 307 to retract to a certain extent from the conformal portion of the surface of the slot. However, the extent of this retraction would be limited, and since it depends on the tolerances of the components it may be inconsistent from one turbine unit to another. For that reason, the shroud 6 is rotatable about the rotational axis, at least through a certain axial range which is greater than 0.05°, and typically at least 0.1°. However, it is undesirable for the shroud to be rotatable completely freely relative to the turbine housing, for example because it may lead to wear between the shroud and the turbine housing.

A pin member will now described which is an embodiment of the present invention, and is for use in a turbine in which the shroud is arranged to be relatively rotatable with respect to the turbine housing about the rotational axis of the turbine. At least one pin member of this type is provided in the turbine to limit the rotational range of the shroud.

Figure 8:
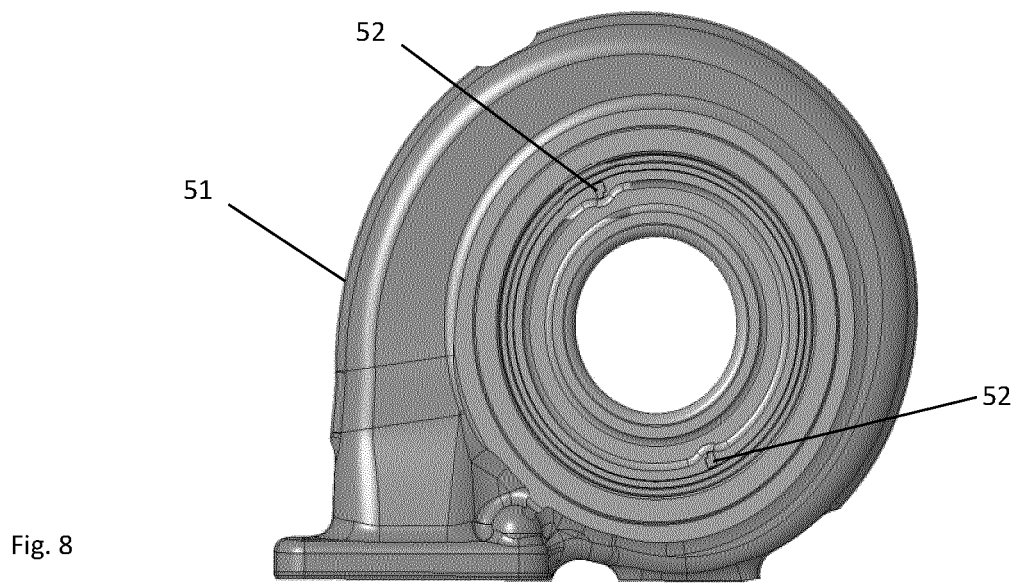
FIG. 8 shows a turbine housing comprising two pin members which are embodiments of the invention.

Referring to FIG. 8, a turbine housing 51 is shown in combination with two pin members 52. As described below, each pin member 52 comprises a cylindrical body which is inserted into a correspondingly shaped aperture within a surface of the turbine which faces in a direction parallel to the rotational axis of the turbine.

Figure 9:
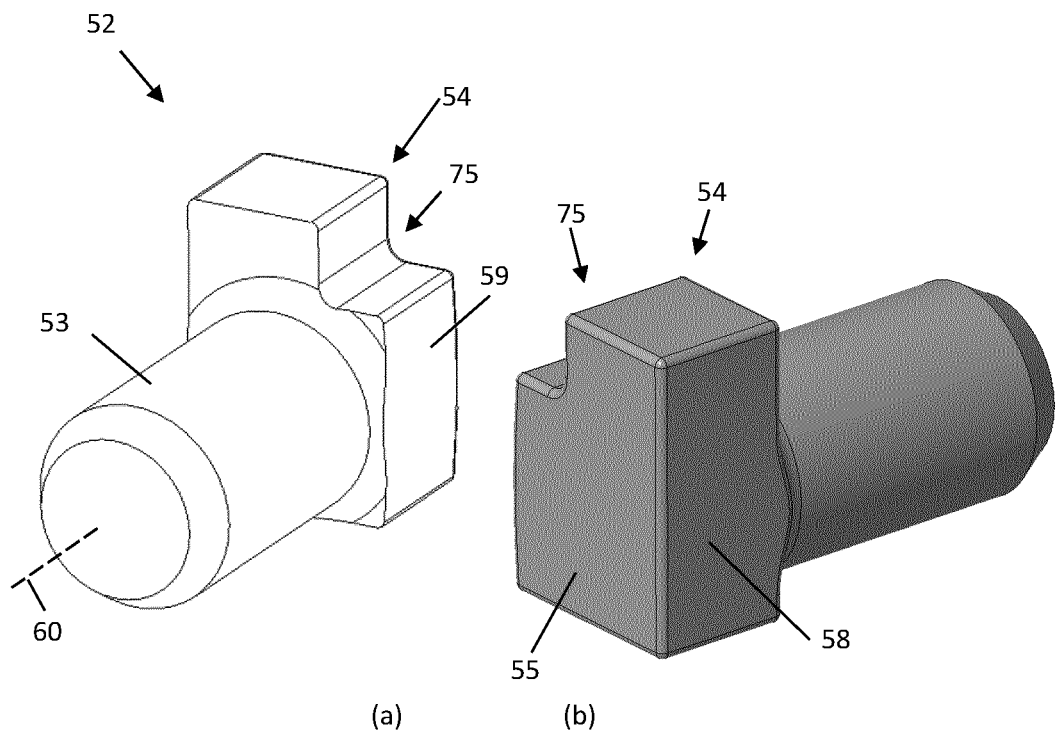
FIG. 9 is composed of FIGS. 9(a)-9(c), which are perspective views of the pin member of FIG. 8 from different directions.
Figure 9:
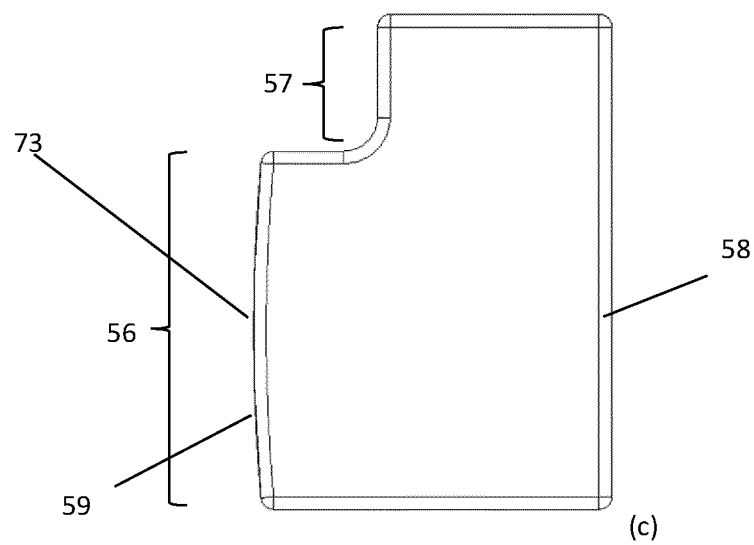

FIG. 9(*a*)-(*c*) show the pin member 52 from three different perspectives. The pin member 52 includes a cylindrical body 53 and a head portion 54. The cylindrical body has a central "pin" axis 60 which in use is substantially parallel to the rotational axis of the turbine. The head portion 54 has a head surface 55 which is transverse to the pin axis 60. The head surface 55 is generally L-shaped, and comprises, and may substantially consist of, a first generally rectangular portion 56 and a second generally rectangular portion 57. The area of the first rectangular portion 56 is greater than the area of the second rectangular portion 57. The second rectangular portion 57 is further than the first rectangular portion 55 in a second direction y than the first rectangular portion. The second direction is transverse to the pin axis 60, and in use is arranged to extend radially from the rotational axis of the turbine. Note that from another point of view the head portion 54 may be considered as a cuboidal body minus a generally cuboidal recess 75. Any or all of the edges and corners of the pin member 52 are bevelled, rounded, or otherwise smoothed to avoid sharp corners; the references herein to surfaces neglect this effect, and consider the surfaces as if they extended to sharp corners.

The pin member 52 may be formed by moulding, preferably by a process which does not produce a transition (interface) within the pin member 52. The molding material may be a Cobalt alloy.

The diameter of the cylinder body may be selected in view of the distance from the rotational axis to the pin axis 60 (that is, half the pitch circle diameter (PCD)). Experimentally, it has been found that a diameter d of the cylindrical body which provides the pin with sufficient strength without requiring unnecessary material, is given by d=A×PCD to within an accuracy of 10%, where A=0.035. For example, in the case of a PCD of 115 mm, the cylindrical body may have a diameter of substantially 4 mm, e.g. 4 mm to within an accuracy of 0.4 mm.

The rectangular portions 56, 57 are both bordered by a substantially flat positioning surface 58. The surface of the head portion opposed to the positioning surface 57 is a limit surface 59, which forms one side of the first rectangular portion 55. The limit surface may be translationally symmetric parallel to the pin axis 60.

The positioning surface 58 and limit surface 59 are spaced apart in a first direction shown as x in FIG. 9(*c*). The first direction is transverse to the positioning surface 58, to the pin axis 60 and to the second direction y.

Figure 10:
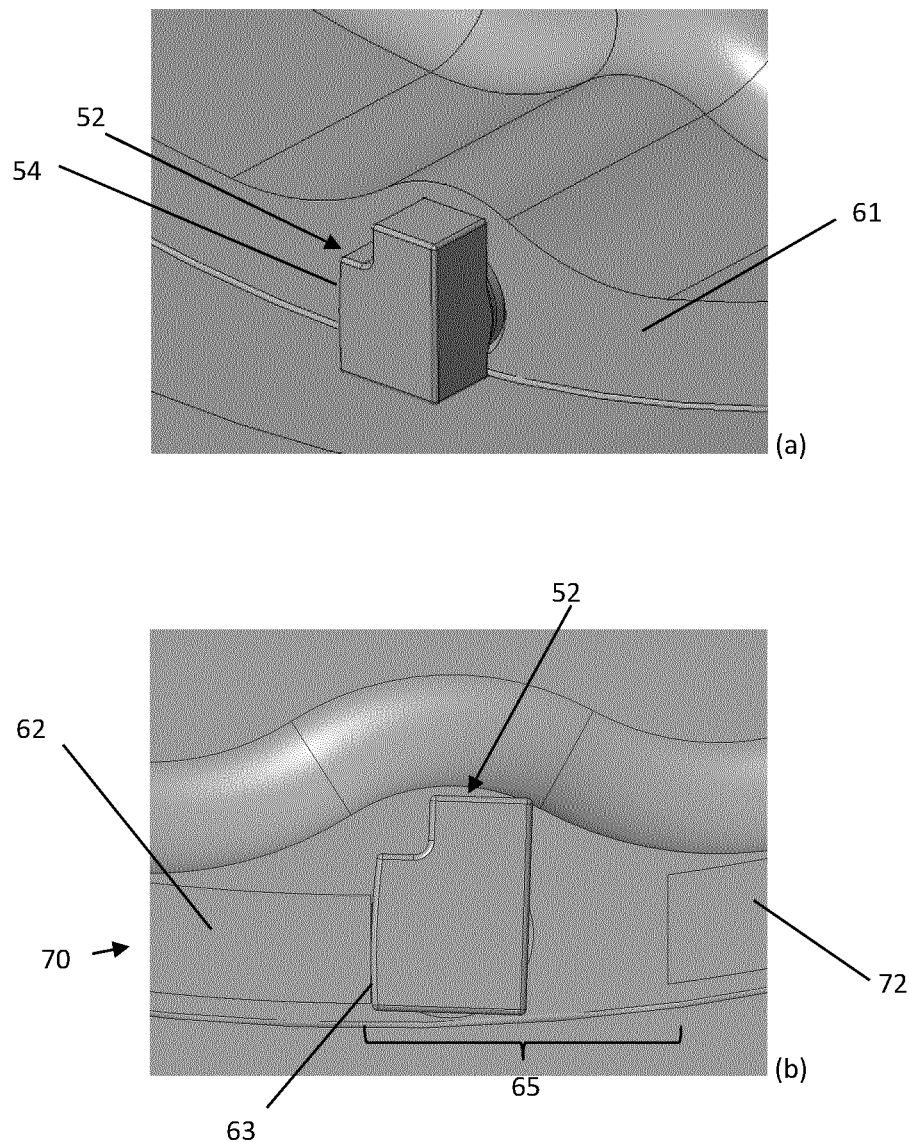
FIG. 10 is composed of FIGS. 10(a)-10(b), which show the pin member of FIG. 8 in use with a turbine housing viewed from different directions.

Turning to FIG. 10(*a*), in use the cylindrical body 53 of the pin member 52 is inserted into a generally-cylindrical aperture 71 in an axially-facing surface 61 of the turbine housing, leaving only the head portion 54 of the pin member 52 exposed. In this configuration the pin axis 60 coincides with the rotational axis of the turbine, so that both directions are referred to as "axial". The second direction y may extend in the radial direction away from the rotational axis of the turbine, whereas the first direction x may extend circumferentially about the rotational axis. Thus, the positioning surface 58 faces generally circumferentially, as does the limit surface 59, at least at its point 73 furthest from the positioning surface 58.

FIG. 10(*b*) is a view looking in the axial direction at the pin member 52 inserted into the aperture 71. Two shroud rim portions 62, 72 of a shroud 70 are illustrated in this view. The shroud 70 is rotatable about the turbine axis, and has a limit surface 63 for impacting the limit surface 59 of the pin member 52. Note that rotation of the shroud 70 is additionally limited by its collisions with the vanes, so the shroud 70 does not impact the positioning surface 58 of the head portion 54 of the pin member 52.

The shroud 70 defines a gap 65 between the shroud rim portions 62, 72. The head portion 54 of the pin member 52 is in this gap. Thus, the pin member 52 prevents the shroud 70 from rotating by more than a certain angular amount in the anti-clockwise direction as viewed in FIG. 10(*b*) by more than a certain angular amount. Note that this achieved without requiring high tolerance in the shape of the shroud rim portions 62, 72. This is because the exact circumferential extent of the gap 65 is not relevant. Provided the gap 65 is significantly larger than the circumferential extent of the head portion 54 of the pin member 54 (e.g. at least 50% larger), the pin member 52 can conveniently be inserted into the aperture 71 when the shroud 70 is attached to the turbine housing 1, or conversely the shroud 70 can conveniently be assembled onto the turbine housing when the pin member(s) 52 are already inserted into the aperture(s) 71. Only the surface 63 of the shroud rim portion 62 impacts on the limit surface 59 of the pin member 52.

Figure 11:
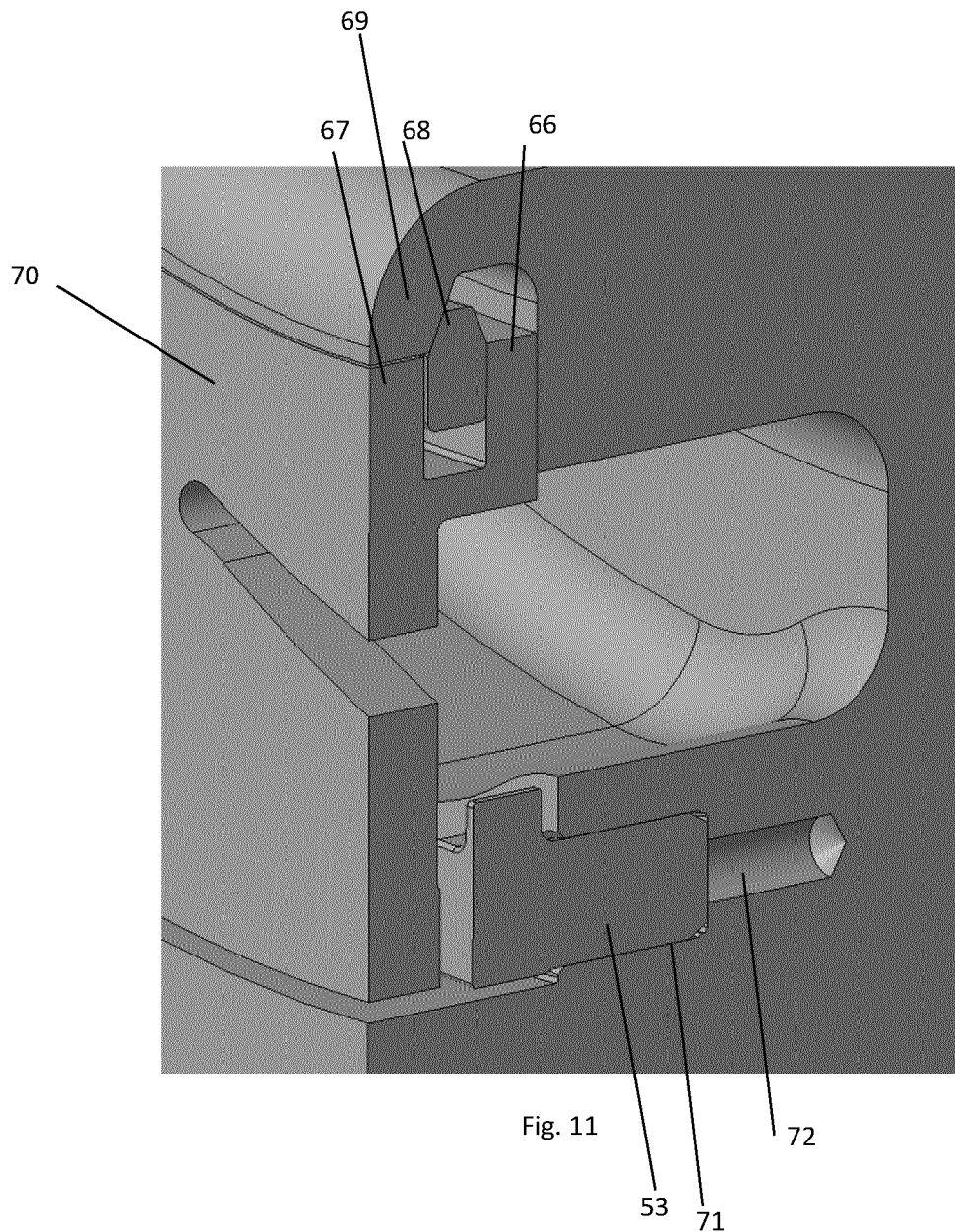
FIG. 11 is a cross-sectional diagram of the pin member of FIG. 8 in use.

FIG. 11 is a cross-sectional view of the turbine housing when it is supporting the shroud 70. The bearing housing and the nozzle ring are omitted. The radially-inner portion of the shroud 70 defines a bracket, having inner and outer annular walls 66, 67. Between the annular walls 66, 67 is positioned a retaining ring 68. The retaining ring 68 extends radially-inwardly out of the gap between the annular walls 66, 67, and its inner portion is retained by an annular lip 69 of the turbine housing. Providing the retaining ring 68 at the radially inner portion of the shroud 70, has been found to provide excellent resistance to gas leakage at the radially-inner edge of the shroud 70.

The cylindrical body 53 of the pin member is inserted into the corresponding aperture 71 defined by the turbine housing. A chamber 72 is provided at an inner portion of the aperture 71, to prevent the pressure of any trapped gas becoming excessively high during the operation of the turbine, and thereby expelling the pin 52 from the aperture 71.

Figure 12:
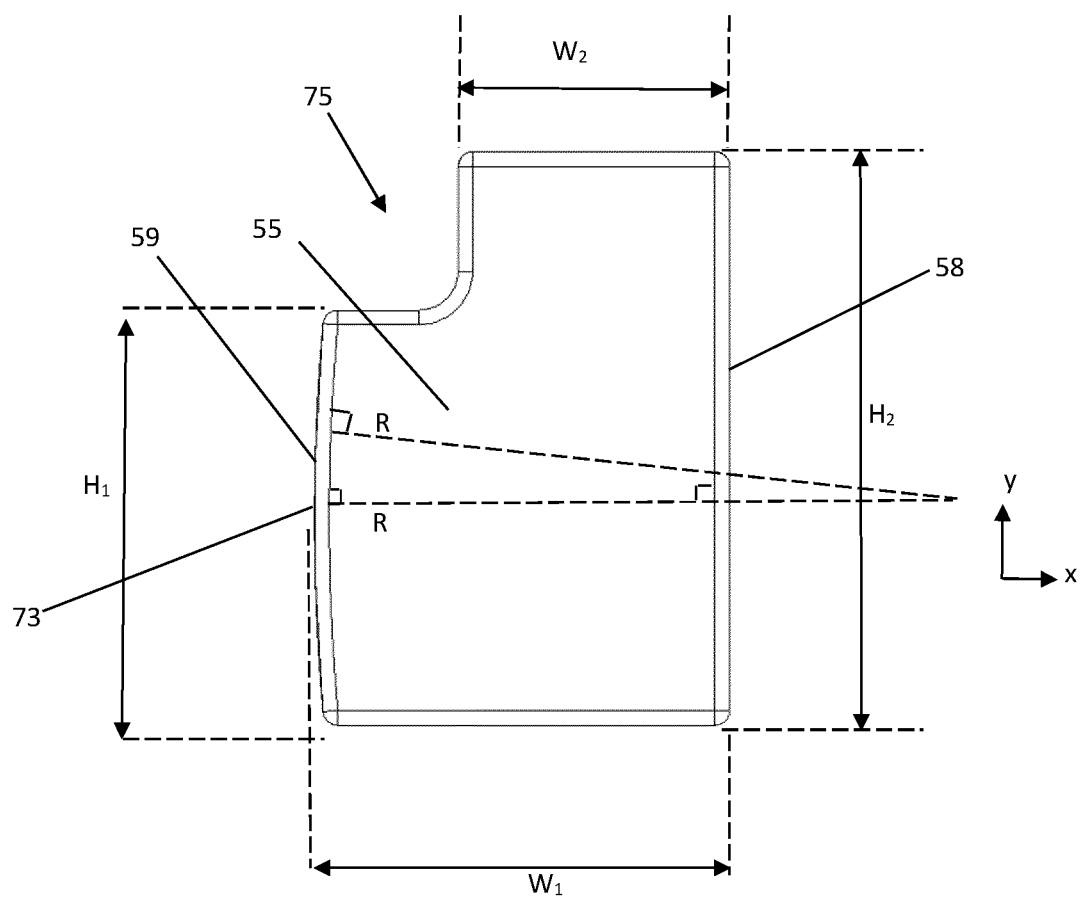
FIG. 12 illustrates how certain parameters of the pin member are defined.

Turning to FIG. 12, this defines the parameters $H_1$, $H_2$, $W_1$, $W_2$ and R, where R is the radius of curvature of the limit surface 59. The distance $W_1$ is measured from the substantially flat positioning surface 58, in the transverse first direction x, to the point 73 on the limit surface 59 which is furthest from the positioning surface 58. The radius of curvature of the cylindrical limit surface 59 at the point 73 is R. R is greater than the extent $W_1$ of the head portion of the pin member in the first direction x. $W_1$ is greater than the extent $W_2$ of the smaller rectangular portion head portion 57 of the pin member 52 in the first direction x.

Desirably, $$\frac{(W_1 - W_2)^2 + \left(H_2 - \frac{1}{2}H_1\right)^2}{2(W_1 - W_2)} \le R \le 20H_1.$$

The invention claimed is:

1. A pin member suitable for limiting rotational movement of a shroud relative to a turbine housing, the pin member comprising a generally cylindrical body defining a pin axis, and a head portion at one end of the cylindrical body, the head portion being integrally formed with the cylindrical body so that the head portion and the cylindrical body together form a one-piece unit, the head portion having a limit surface for in use bearing against a surface of the shroud and limiting its rotational motion, and an opposed positioning surface for positioning the pin member, the limit surface and positioning surfaces being spaced from each other in a first direction;

the head portion of the pin member having a head surface which is transverse to the pin axis, and bounded on one side by the limit surface and on the other side by the positioning surface, the extent $H_1$ of the limit surface in a second direction transverse to the first direction and to the pin direction being less than the extent $H_2$ of the positioning surface in the second direction;

and the limit surface being convex.

2. The pin member of claim 1 in which the head surface is substantially composed of two generally rectangular portions, with a first of the rectangular portions being further in the second direction than second of the rectangular portions, the first of the rectangular portions having a greater area than the second of the rectangular portions, the first and second rectangular portions both being bordered by the positioning surface.

3. The pin member of claim 2 in which the head portion of the pin member has a greater extent $W_1$ in the first direction, than the extent $W_2$ in the first direction of the second rectangular portion.

4. The pin member of claim 1 in which the limit surface has translational symmetry parallel to the pin axis, the limit surface having a radius of curvature R.

5. The pin member of claim 4 in which the radius of curvature of the limit surface, R, is greater than the extent $W_1$ of the head portion of the pin member in the first direction.

6. The pin member of claim 3 in which the limit surface has translational symmetry parallel to the pin axis, the limit surface having a radius of curvature R, and $W_1$, $W_2$, $H_1$, $H_2$ and R satisfy the equation:

$$\frac{(W_1 - W_2)^2 + \left(H_2 - \frac{1}{2}H_1\right)^2}{2(W_1 - W_2)} \le R \le 20H_1.$$

7. The pin member of claim 1 which is without an internal transition.

8. The pin member of claim 1 which is composed of an alloy comprising Cobalt.

9. The pin member of claim 1 in which the cylindrical body has a diameter of substantially 4 mm.

10. A turbine housing for a turbine, the turbine housing defining a central axis which in use is the rotational axis of the turbine, and at least one pin member suitable in use for limiting rotational movement relative to the turbine housing of a shroud mounted in the turbine housing encircling the central axis of the turbine housing, the pin member comprising a generally cylindrical body defining a pin axis, and a head portion at one end of the cylindrical body, the head portion being integrally formed with the cylindrical body so that the head portion and the cylindrical body together form a one-piece unit, the head portion having a limit surface for in use bearing against a surface of the shroud and limiting its rotational motion, and an opposed positioning surface for positioning the pin member, the limit surface and positioning surfaces being spaced from each other in a first direction;

the head portion of the pin member having a head surface which is transverse to the pin axis, and bounded on one side by the limit surface and on the other side by the positioning surface, the extent H1 of the limit surface in a second direction transverse to the first direction and to the pin direction being less than the extent H2 of the positioning surface in the second direction;

and the limit surface being convex.

11. The turbine housing of claim 10 in which each pin member is located in a corresponding aperture of the turbine housing.

12. The turbine housing of claim 10 in which the pin member has a circular cross-section having a diameter d which is given by d=A×PCD to within an accuracy of 10%, where A=0.035 and PCD is a value which is twice a distance from the pin axis to the central axis.

13. The turbine housing of claim 11 in which the pin member does not fill a chamber of the aperture, whereby in use the pressure is reduced of any gas which was trapped within the aperture when the cylindrical body of the pin member was located in the aperture.

14. A turbocharger comprising a turbine and a compressor driven by the turbine, the turbine comprising:
- a turbine housing defining a central axis which is a rotational axis of the turbine;
- a turbine wheel within the turbine housing;
- a shroud within the turbine housing encircling the rotational axis of the turbine; and
- at least pin member configured to limit rotational movement of the shroud relative to a turbine housing,
- the pin member comprising a generally cylindrical body defining a pin axis, and a head portion at one end of the cylindrical body, the head portion being integrally formed with the cylindrical body so that the head portion and the cylindrical body together form a one-piece unit,
- the head portion having a limit surface for in use bearing against a surface of the shroud and limiting its rotational motion, and an opposed positioning surface for positioning the pin member, the limit surface and positioning surfaces being spaced from each other in a first direction;
- the head portion of the pin member having a head surface which is transverse to the pin axis, and bounded on one side by the limit surface and on the other side by the positioning surface,
- the extent H1 of the limit surface in a second direction transverse to the first direction and to the pin direction being less than the extent H2 of the positioning surface in the second direction,
- and the limit surface being convex.

* * * * *